United States Patent
Crom

(10) Patent No.: US 7,119,679 B1
(45) Date of Patent: Oct. 10, 2006

(54) VEHICLE LOCATING APPARATUS

(76) Inventor: Eugene F. Crom, 414 Beech St., Eden, NC (US) 27288

( * ) Notice: Subject to any disclaimer, the term of this patent is extended or adjusted under 35 U.S.C. 154(b) by 157 days.

(21) Appl. No.: 11/002,040

(22) Filed: Dec. 3, 2004

(51) Int. Cl.
*G08B 1/08* (2006.01)

(52) U.S. Cl. .............. 340/539.32; 340/539.1; 340/425.5; 340/426.22; 340/426.23

(58) Field of Classification Search .......... 340/539.32, 340/539.1, 425.5, 426.18, 426.22, 426.23
See application file for complete search history.

(56) References Cited

U.S. PATENT DOCUMENTS

| 4,254,405 | A | * | 3/1981 | Wenzlaff ............... 340/321 |
| 4,797,671 | A | | 1/1989 | Toal, Jr. |
| 5,089,803 | A | | 2/1992 | Bohn |
| D359,924 | S | | 7/1995 | Grumbeck |
| 5,773,913 | A | * | 6/1998 | Casselden ............. 310/338 |
| 5,786,758 | A | | 7/1998 | Bullock |
| 5,900,826 | A | * | 5/1999 | Farber ................ 340/908 |
| 5,933,081 | A | | 8/1999 | Jones |
| 6,040,761 | A | * | 3/2000 | Grasmann ............ 340/425.5 |
| 6,071,166 | A | * | 6/2000 | Lebensfeld et al. ...... 446/175 |
| 6,239,701 | B1 | | 5/2001 | Vasquez et al. |
| 6,580,368 | B1 | | 6/2003 | Jacobs |
| 6,738,712 | B1 | * | 5/2004 | Hildebrant ............ 701/213 |
| 7,068,163 | B1 | * | 6/2006 | Sari et al. ........... 340/539.13 |

* cited by examiner

*Primary Examiner*—Daryl C Pope

(57) ABSTRACT

A vehicle locating apparatus includes a first housing that is translucent and has an enclosed interior having an aperture therein for receiving a coupler that is adapted for removably attaching the first housing to a vehicle antenna. A light emitter assembly is mounted on the coupler and extends into the first housing. A first control is electrically coupled to the light emitter for selectively turning the light emitter on or off. A second housing is removably attachable to the vehicle. A sound emitter assembly is mounted in the second housing. A second control is electrically coupled to the sound emitter for selectively turning the sound emitter on or off. An actuator is adapted for selectively sending a remote signal to the first control or the second control so that a respective one of the light and sound emitters is turned on.

10 Claims, 6 Drawing Sheets

VEHICLE LOCATING APPARATUS

BACKGROUND OF THE INVENTION

1. Field of the Invention

The present invention relates to vehicle locating devices and more particularly pertains to a new vehicle locating device for aiding a person in the location of their vehicle.

2. Description of the Prior Art

The use of vehicle locating devices is known in the prior art. U.S. Pat. No. 6,239,701 describes a device that is attachable to an antenna and emits a flashing light when turned on to aid a person in finding their vehicle. Another type of vehicle locating device is U.S. Pat. No. 5,933,091 that also includes a device that is attachable to an antenna for providing an illuminated guide for locating a vehicle. U.S. Pat. No. 6,580,368 is a similar device that is attachable to a vehicle and provides a light source when turned on for locating a vehicle.

While these devices fulfill their respective, particular objectives and requirements, the need remains for a device that includes separate sound and light emitters for allowing a person to selectively elect which device to use. Each device preferably includes its own power supply to reduce the risk of overall power failure. The sound emitter allows for a person to located their vehicle in areas, such as a parking garage, where a light emitter may not be easily seen, whereas the light emitter may be used in areas of high ambient noise.

SUMMARY OF THE INVENTION

To this end, the present invention generally comprises a first housing that has an enclosed interior. The first housing has an aperture extending therein. A peripheral flange is attached to the first housing and extends around a peripheral edge of the aperture. The first housing is comprised of a translucent material. A coupler is adapted for removably attaching the first housing to a vehicle antenna. The coupler has an upper end and a lower end. The lower end has a bore extending therein. The antenna is removably extendable into the bore. An upper end of the coupler is removably positioned in and frictionally couplable to the flange. The coupler is comprised of a resiliently elastic material. A light emitter assembly is mounted on the upper end of the coupler. The light emitter assembly emits a light when the light emitter assembly is turned on. A first control is electrically coupled to the light emitter for selectively turning the light emitter on or off. A second housing is removably attachable to the vehicle. A sound emitter assembly is mounted in the second housing. The sound emitter assembly emits a plurality of sounds when the sound emitter assembly is turned on. A second control is electrically coupled to the sound emitter for selectively turning the sound emitter on or off. An actuator is adapted for selectively sending a remote signal to the first control or the second control so that a respective one of the light and sound emitters is turned on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
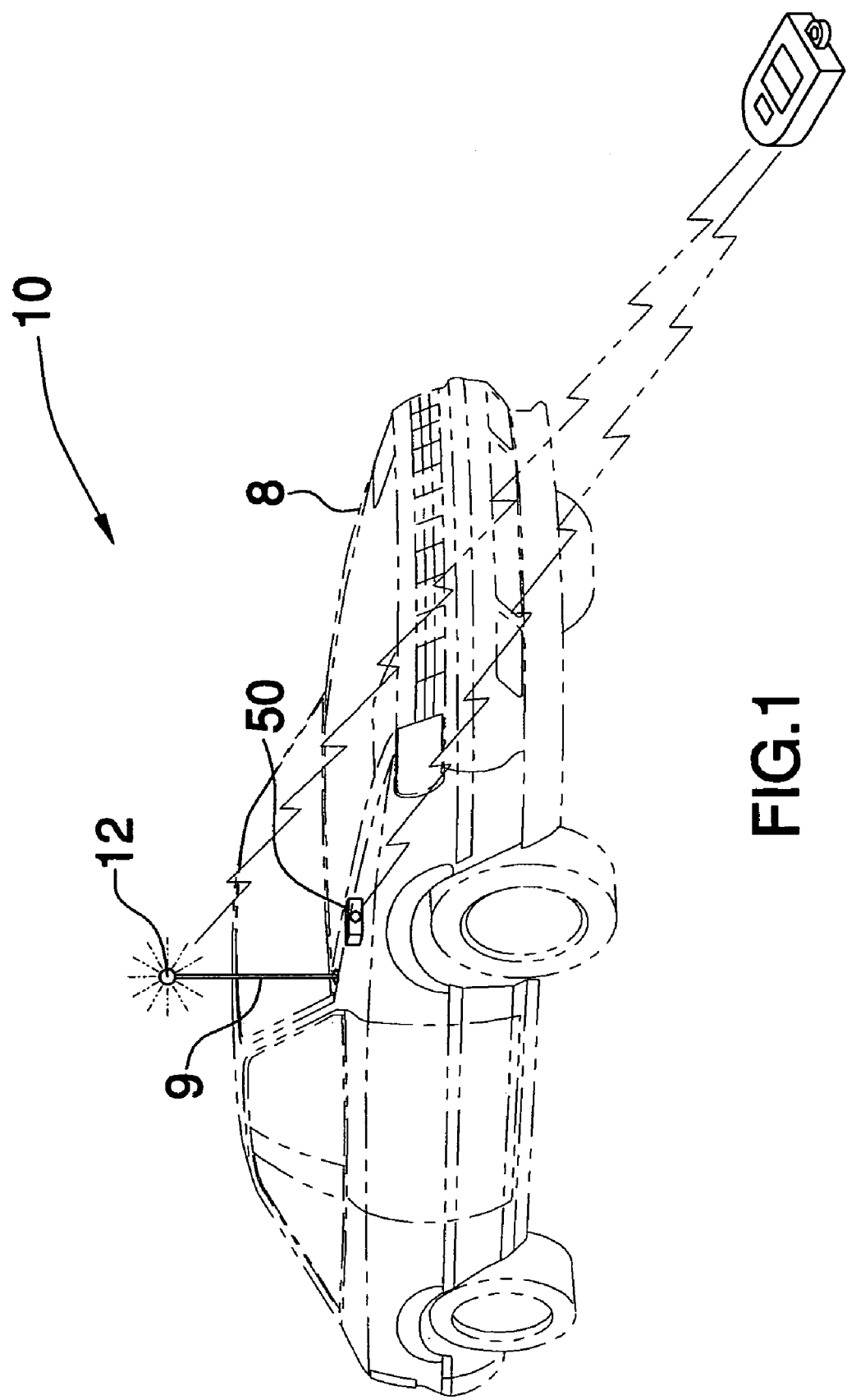
FIG. 1 is a perspective in-use view of a vehicle locating apparatus according to the present invention.
Figure 2:
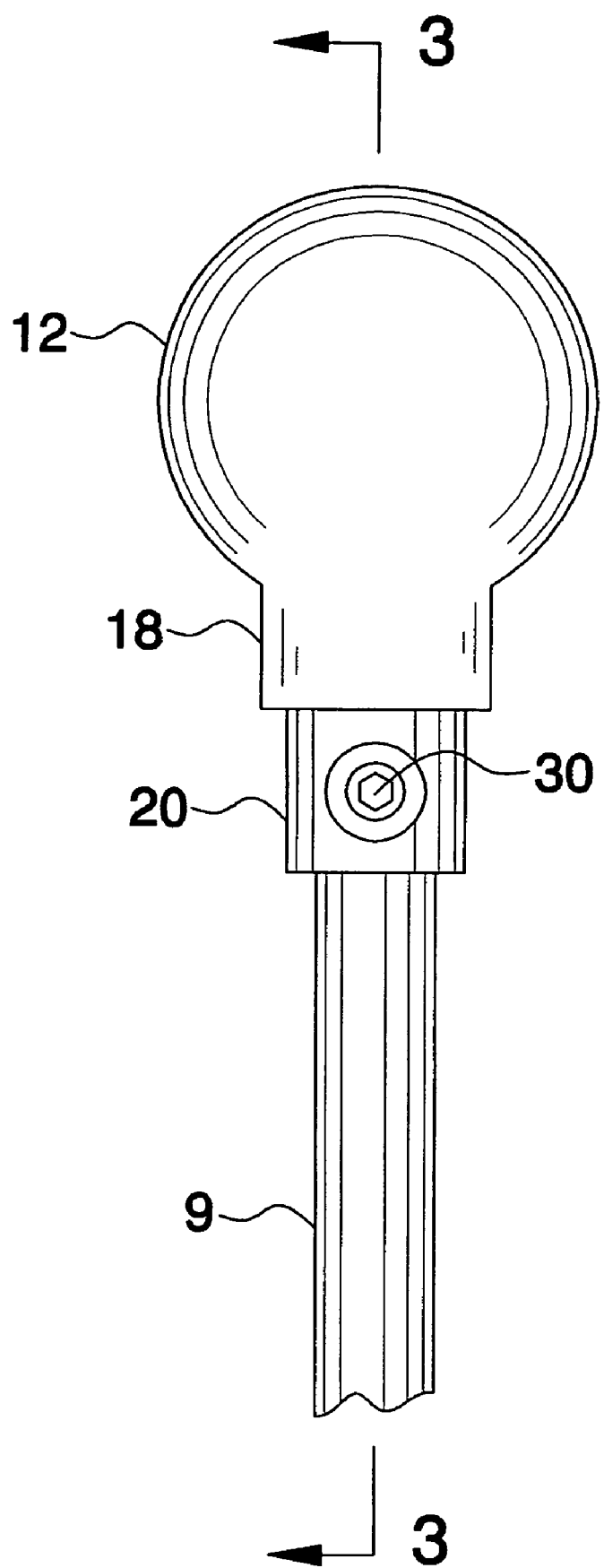
FIG. 2 is a front view of the first housing of the present invention.
Figure 3:
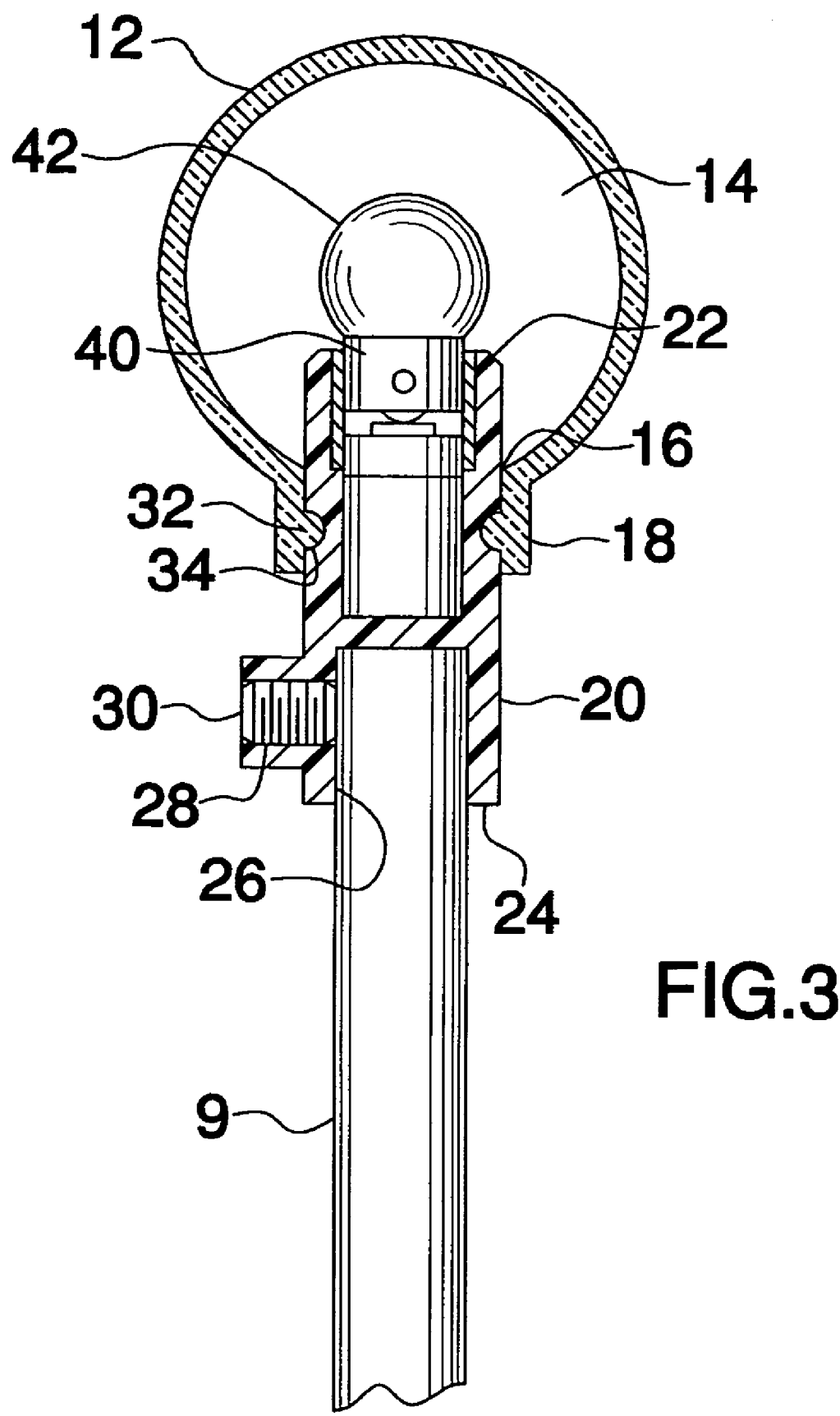
FIG. 3 is a cross-sectional view taken along line 3—3 of FIG. 2 of the present invention.

With reference now to the drawings, and in particular to FIGS. 1 through 7 thereof, a new vehicle locating device embodying the principles and concepts of the present invention and generally designated by the reference numeral 10 will be described.

Figure 4:
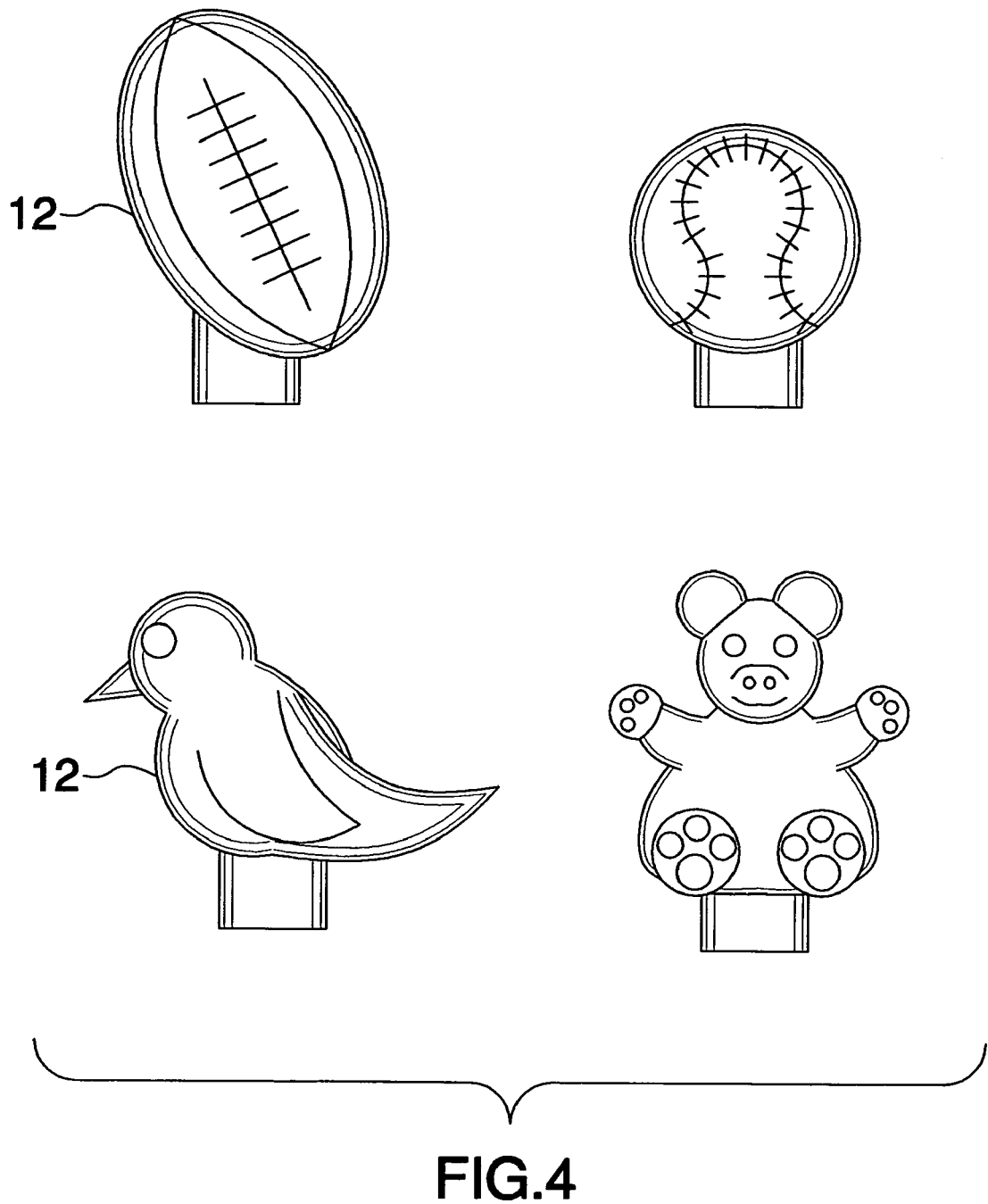
FIG. 4 is a front view of alternative embodiments of the first housing of the present invention.
Figure 5:
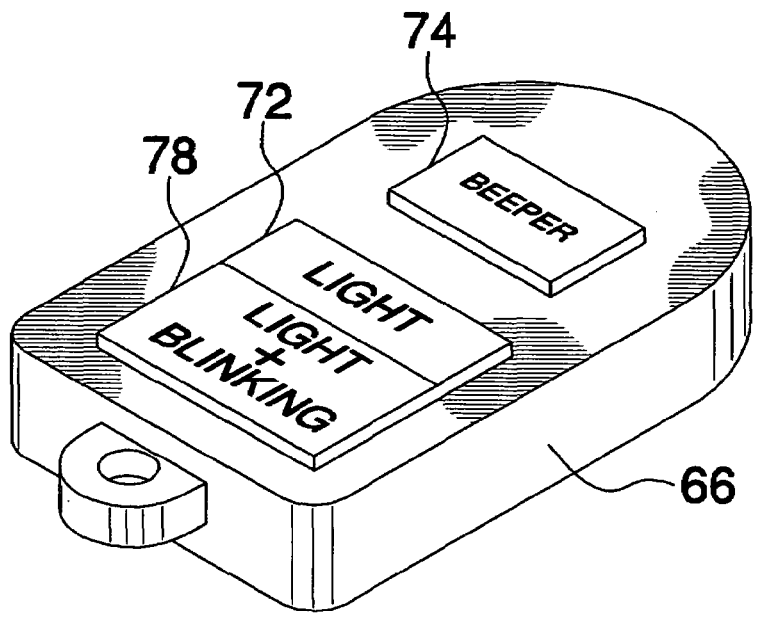
FIG. 5 is a perspective view of an actuator of the present invention.
Figure 6:
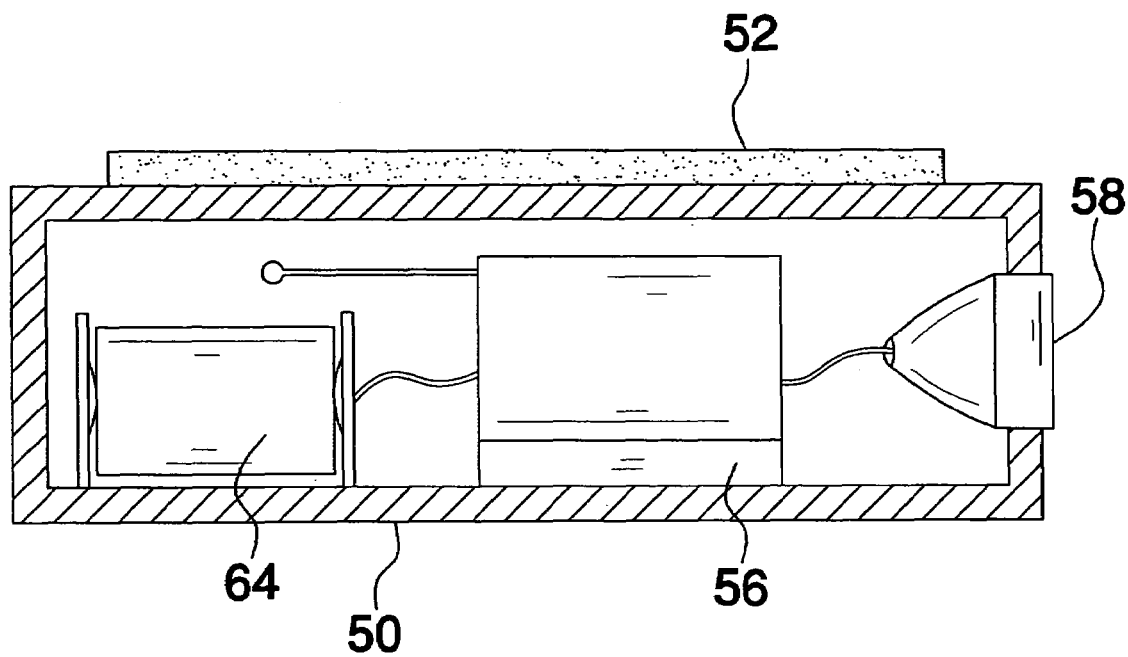
FIG. 6 is a cross-sectional view of a second housing of the present invention.
Figure 7:
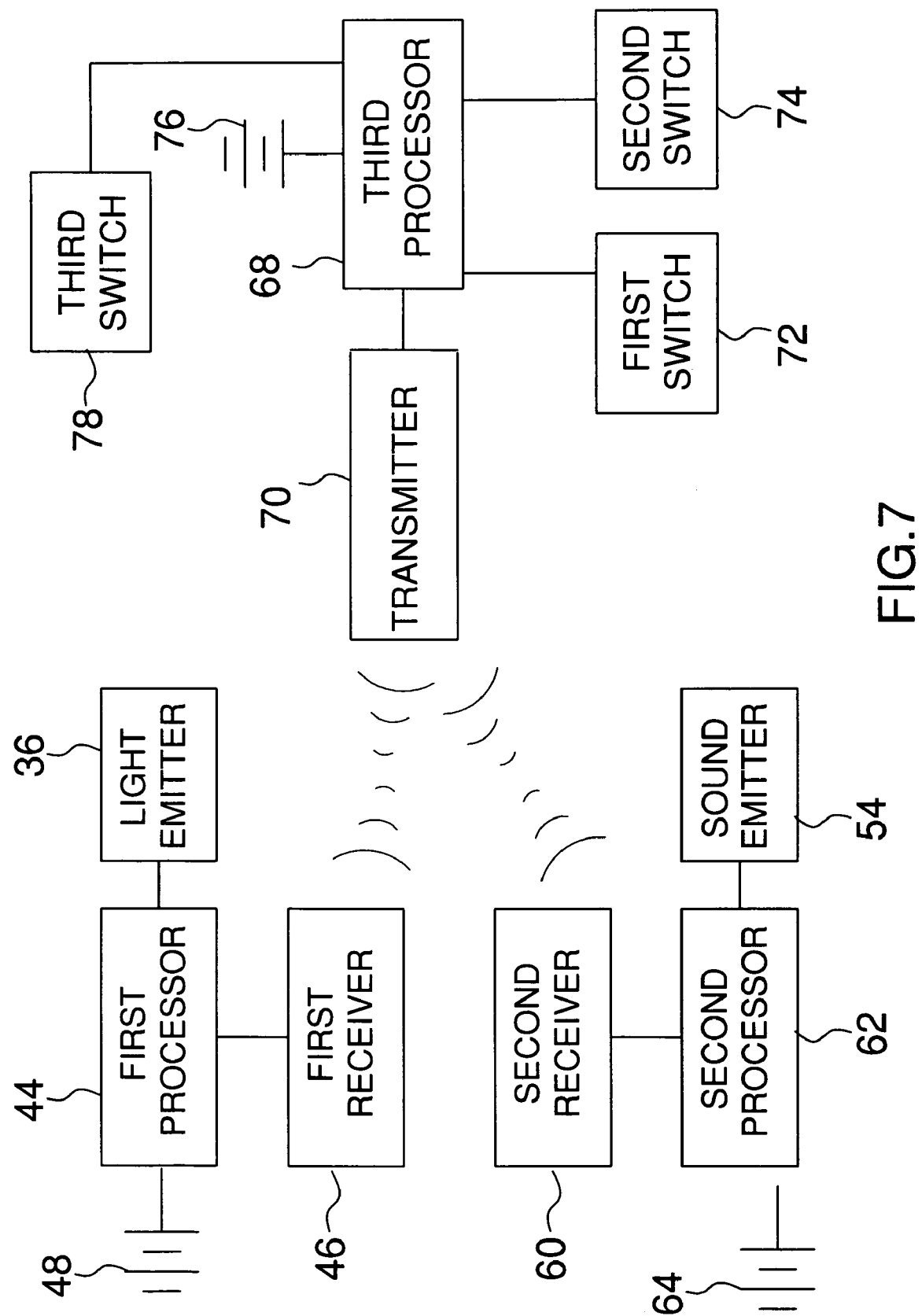
FIG. 7 is a schematic view of the present invention.

As best illustrated in FIGS. 1 through 7, the vehicle locating apparatus 10 generally comprises a first housing 12 that has an enclosed interior 14. The first housing 12 has an aperture 16 extending therein. A peripheral flange 18 is attached to the first housing 12 and extends around a peripheral edge of the aperture 16. The first housing 12 is comprised of a translucent material, which is preferably a plastic material. The first housing 12 preferably has a substantially spherical shape, though alternate shapes may be used as shown in FIG. 4.

A coupler 20 is adapted for removably attaching the first housing 12 to a vehicle 8 antenna 9. The coupler 20 has an upper end 22 and a lower end 24. The lower end 24 has a bore 26 extending therein. The antenna 9 is removably extendable into the bore 26. The coupler 20 has a threaded opening 28 therein that extends into the bore 26. A fastener 30 is removably extendable into the opening 28 and is abuttable against the antenna 9 to prevent the coupler 20 from being easily removed from the antenna 9. The upper end 22 of the coupler 20 is removably positioned in and frictionally couplable to the flange 18. A peripheral ridge 32 on the flange 18 may be extended into a peripheral slot 34 on the coupler 20 to snappily attach the coupler 20 to the flange 18. The coupler 20 is comprised of a resiliently elastic material to aid in frictionally coupling the coupler 20 to the antenna 9.

A light emitter assembly 36 is mounted on the upper end 22 of the coupler 20. The light emitter assembly 36 emits a light when the light emitter assembly 36 is turned on. The light emitter assembly 32 includes a light socket 40 and a light bulb 42 removably mounted in the socket 40.

A first control is electrically coupled to the light emitter 36 for selectively turning the light emitter 36 on or off. The first control includes a first receiver 44 for receiving a wireless signal. A first processor 46 is electrically coupled to the first receiver 44 and is adapted for receiving a first signal from the first receiver 44. The first processor 46 is electrically coupled to the light emitter assembly 36. The first processor 46 turns on the light emitter assembly 36 when the first processor 46 receives the first signal from the first receiver 44. A first power supply 48 is electrically coupled to the first processor 46.

A second housing 50 is removably attachable to the vehicle 8. This is accomplished with a securing member 52 that is attached to the second housing 50. The securing member 52 is adapted for securing the second housing 50 to the vehicle 8 and may include a magnet or adhesive, though conventional fasteners may also be used.

A sound emitter assembly 54 is mounted in the second housing 50. The sound emitter assembly 54 emits a plurality of sounds when the sound emitter assembly is turned on. The sound emitter 54 includes a memory storage means 56 for storing a plurality of sounds. The plurality of sounds may include songs or a speaking voice. A speaker 58 is electrically coupled to the storage means 56.

A second control is electrically coupled to the sound emitter 54 for selectively turning the sound on or off. The second control includes a second receiver 60 for receiving a wireless signal. A second processor 62 is electrically coupled to the second receiver 60 and is adapted for receiving a second signal from the second receiver 60. The second processor 62 is electrically coupled to the sound emitter assembly 54. The second processor 62 turns on the second emitter assembly 54 when the second processor 62 receives the second signal from the second receiver 60. A second power supply 64 is electrically coupled to the second processor.

An actuator 66 is adapted for selectively sending a remote signal to the first control or the second control. The actuator 66 includes a third processor 68 that is adapted for selectively producing the first signal or the second signal. A transmitter 70 is electrically coupled to the third processor 68 and is adapted for wirelessly transmitting to the first 46 and second 60 receivers a signal produced by the third processor 68. A first switch 72 is electrically coupled to the second processor 62 for inducing the third processor 68 to produce the first signal. A second switch 74 is electrically coupled to the third processor 68 for inducing the third processor 68 to produce the second signal. A third power 76 supply is electrically coupled to the third processor 68. The first 44, second 60 and third 68 processors may comprise any conventional processor or microchip, which may be programmed as indicated above. A third switch 78 is electrically coupled to the third processor 68 for sending an intermittent first signal to the first receiver 46.

In use, the first housing 12 is placed on an antenna 9. When a person wishes to locate their vehicle, the first switch 72 is depressed to illuminate the first housing 12. The user may also, or alternatively, depress the second switch 74 to cause the sound emitter assembly 54 to emit the stored sounds. The illuminated first housing 12 and sounds aid a person in locating the vehicle 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle locating apparatus for removably attaching to an antenna of a vehicle, said assembly comprising:
   a first housing having an enclosed interior, said first housing having an aperture extending therein, a peripheral flange being attached to said first housing and extending around a peripheral edge of said aperture, said first housing being comprised of a translucent material;
   a coupler being adapted for removably attaching said first housing to the antenna, said coupler having an upper end and a lower end, said lower end having a bore extending therein, the antenna being removably extendable into said bore, said upper end of said coupler being removably positioned in and frictionally couplable to said flange, said coupler being comprised of a resiliently elastic material;
   a light emitter assembly being mounted on said upper end of said coupler, said light emitter assembly emitting a light when said light emitter assembly is turned on;
   a first control being electrically coupled to said light emitter for selectively turning said light emitter on or off;
   a second housing being removably attachable to said vehicle;
   a sound emitter assembly being mounted in said second housing, said sound emitter assembly emitting a plurality of sounds when said sound emitter assembly is turned on;
   a second control being electrically coupled to said sound emitter for selectively turning said sound emitter on or off;
   an actuator being adapted for selectively sending a remote signal to said first control or said second control such that a respective one of said light emitter assembly and said sound emitter assembly is turned on.

2. The apparatus according to claim 1, wherein said first housing has a substantially spherical shape.

3. The apparatus according to claim 1, wherein said coupler has a threaded opening therein extending into said bore, a fastener being removably extendable into said opening and abuttable against said antenna.

4. The apparatus according to claim 1, wherein said light emitter assembly includes a light socket, and a light bulb removably mounted in said socket.

5. The apparatus according to claim 4, wherein said sound emitter includes a memory storage means for storing a plurality of sounds and a speaker being electrically coupled to said storage means.

6. The apparatus according to claim 5, wherein:
   said first control includes;
      a first receiver for receiving a wireless first signal from said actuator;
      a first processor being electrically coupled to said first receiver and being adapted for receiving a first signal from said first receiver, said first processor being electrically coupled to said light emitter assembly, said first processor turning on said light emitter assembly when said processor receives said first signal from said first receiver;
      a first power supply being electrically coupled to said first processor; and said second control includes;
  a second receiver for receiving a wireless second signal from said actuator;
  a second processor being electrically coupled to said second receiver and being adapted for receiving a second signal from said second receiver, said second processor being electrically coupled to said sound emitter assembly, said second processor turning on said second emitter assembly when said second processor receives said second signal from said second receiver;
  a second power supply being electrically coupled to said second processor.

7. The apparatus according to claim 6, wherein said actuator includes:
  a third processor being adapted for selectively producing said first signal or said second signal;
  a transmitter being electrically coupled to said third processor and being adapted for wirelessly transmitting to said first and second receivers a signal produced by said third processor;
  a first switch being electrically coupled to said second processor for inducing said third processor to produce said first signal;
  a second switch being electrically coupled to said third processor for inducing said third processor to produce said second signal; and
  a third power supply being electrically coupled to said third processor.

8. The apparatus according to claim 1, wherein:
  said first control includes;
    a first receiver for receiving a wireless first signal from said actuator;
    a first processor being electrically coupled to said first receiver and being adapted for receiving a first signal from said first receiver, said first processor being electrically coupled to said light emitter assembly, said first processor turning on said light emitter assembly when said processor receives said first signal from said first receiver;
    a first power supply being electrically coupled to said first processor; and
  said second control includes;
    a second receiver for receiving a wireless second signal from said actuator;
    a second processor being electrically coupled to said second receiver and being adapted for receiving a second signal from said second receiver, said second processor being electrically coupled to said sound emitter assembly, said second processor turning on said second emitter assembly when said second processor receives said second signal from said second receiver;
    a second power supply being electrically coupled to said second processor.

9. The apparatus according to claim 8, wherein said actuator includes:
  a third processor being adapted for selectively producing said first signal or said second signal;
  a transmitter being electrically coupled to said third processor and being adapted for wirelessly transmitting to said first and second receivers a signal produced by said third processor;
  a first switch being electrically coupled to said second processor for inducing said third processor to produce said first signal;
  a second switch being electrically coupled to said third processor for inducing said third processor to produce said second signal; and
  a third power supply being electrically coupled to said third processor.

10. A vehicle locating apparatus for removably attaching to an antenna of a vehicle, said assembly comprising:
  a first housing having an enclosed interior, said first housing having an aperture extending therein, a peripheral flange being attached to said first housing and extending around a peripheral edge of said aperture, said first housing being comprised of a translucent material, said first housing having a substantially spherical shape;
  a coupler being adapted for removably attaching said first housing to the antenna, said coupler having an upper end and a lower end, said lower end having a bore extending therein, the antenna being removably extendable into said bore, said coupler having a threaded opening therein extending into said bore, a fastener being removably extendable into said opening and abuttable against said antenna, said upper end of said coupler being removably positioned in and frictionally couplable to said flange, said coupler being comprised of a resiliently elastic material;
  a light emitter assembly being mounted on said upper end of said coupler, said light emitter assembly emitting a light when said light emitter assembly is turned on, said light emitter assembly including;
    a light socket;
    a light bulb removably mounted in said socket;
  a first control being electrically coupled to said light emitter for selectively turning said light emitter on or off, said first control including;
    a first receiver for receiving a wireless signal;
    a first processor being electrically coupled to said first receiver and being adapted for receiving a first signal from said first receiver, said first processor being electrically coupled to said light emitter assembly, said first processor turning on said light emitter assembly when said processor receives said first signal from said first receiver;
    a first power supply being electrically coupled to said first processor;
  a second housing being removably attachable to said vehicle, a securing member being attached to said second housing, said securing member being adapted for securing said second housing to the vehicle;
  a sound emitter assembly being mounted in said second housing, said sound emitter assembly emitting a plurality of sounds when said sound emitter assembly is turned on, said sound emitter including;
    a memory storage means for storing a plurality of sounds;
    a speaker being electrically coupled to said storage means;
  a second control being electrically coupled to said sound emitter for selectively turning said sound emitter on or off, said second control including;
    a second receiver for receiving a wireless signal;
    a second processor being electrically coupled to said second receiver and being adapted for receiving a second signal from said second receiver, said second processor being electrically coupled to said sound emitter assembly, said second processor turning on said second emitter assembly when said second processor receives said second signal from said second receiver;

a second power supply being electrically coupled to said second processor;

an actuator being adapted for selectively sending a remote signal to said first control or said second control such that a respective one of the light and sound emitters is turned on, said actuator including;

a third processor being adapted for selectively producing said first signal or said second signal;

a transmitter being electrically coupled to said third processor and being adapted for wirelessly transmitting to said first and second receivers a signal produced by said third processor;

a first switch being electrically coupled to said second processor for inducing said third processor to produce said first signal;

a second switch being electrically coupled to said third processor for inducing said third processor to produce said second signal; and a third power supply being electrically coupled to said third processor.

* * * * *